March 15, 1932. B. H. LUNDBORG 1,849,582
LIQUID FILTER
Filed Oct. 24, 1929 3 Sheets-Sheet 2
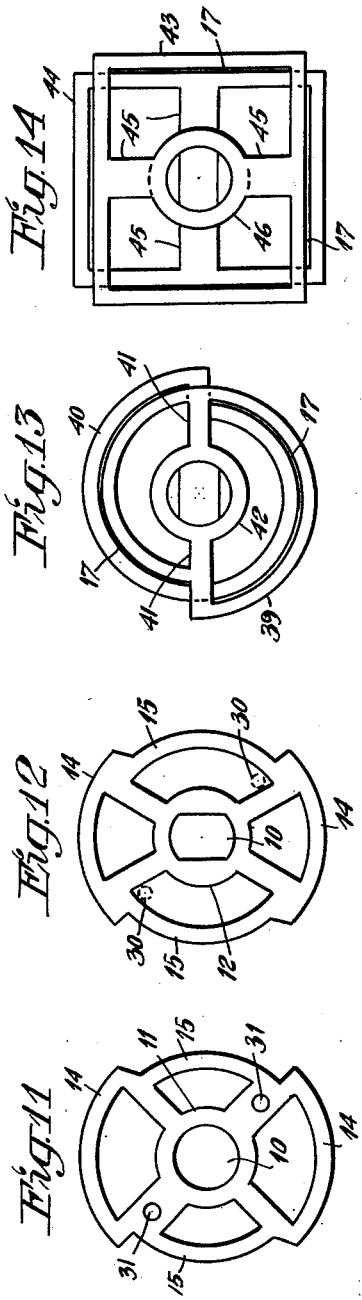
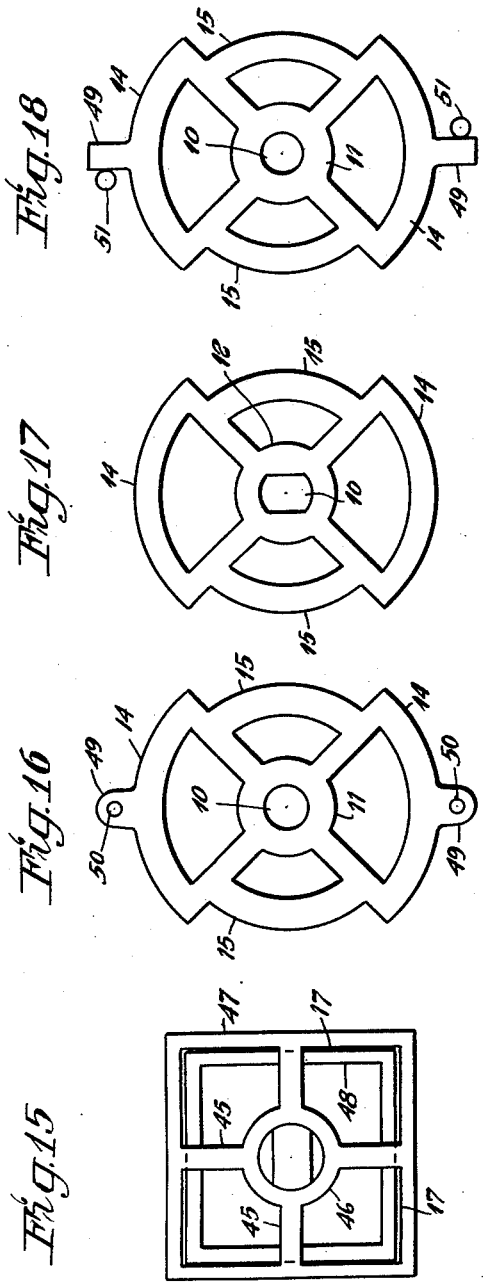

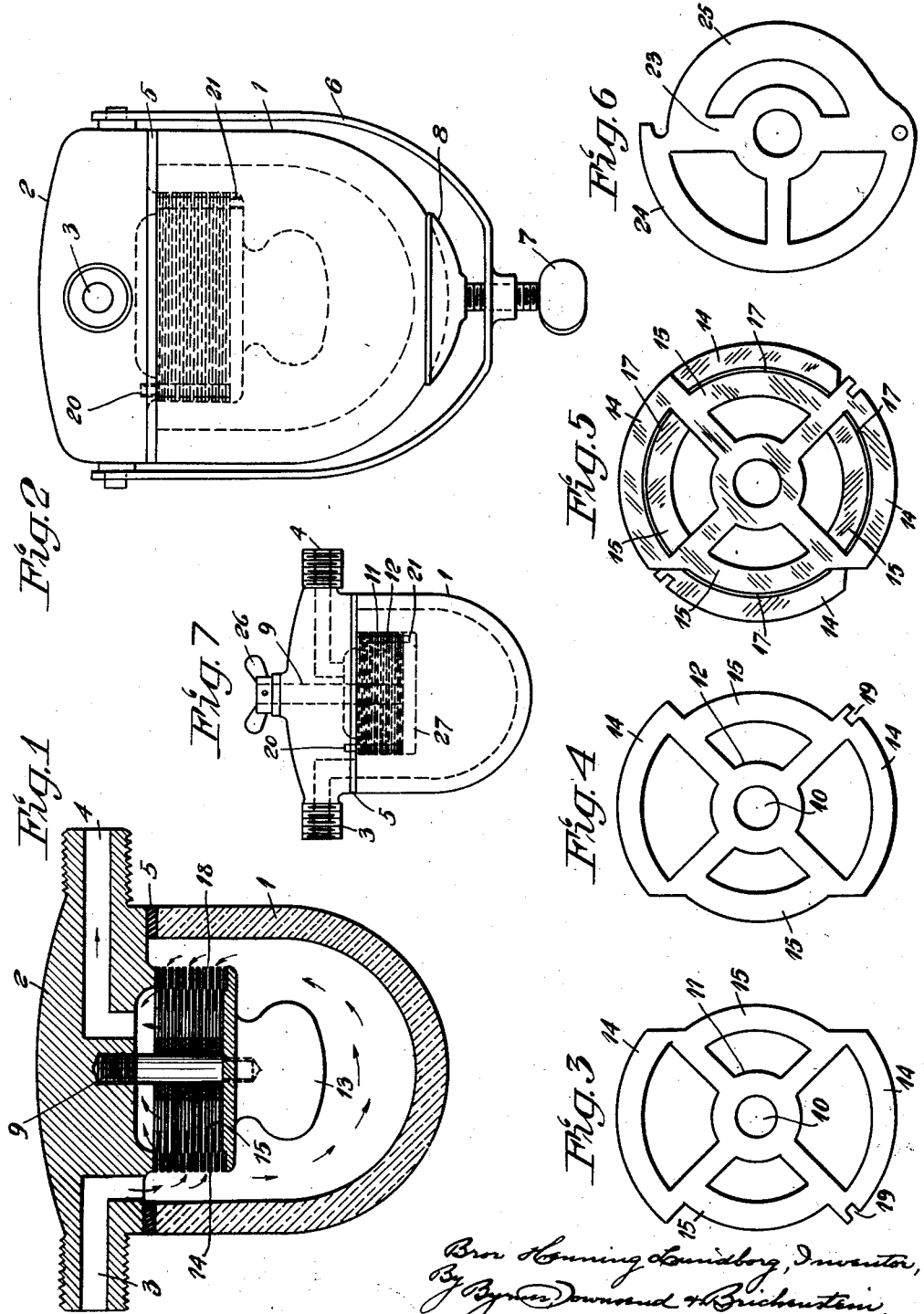

March 15, 1932.　　B. H. LUNDBORG　　1,849,582
LIQUID FILTER
Filed Oct. 24, 1929　　3 Sheets-Sheet 3
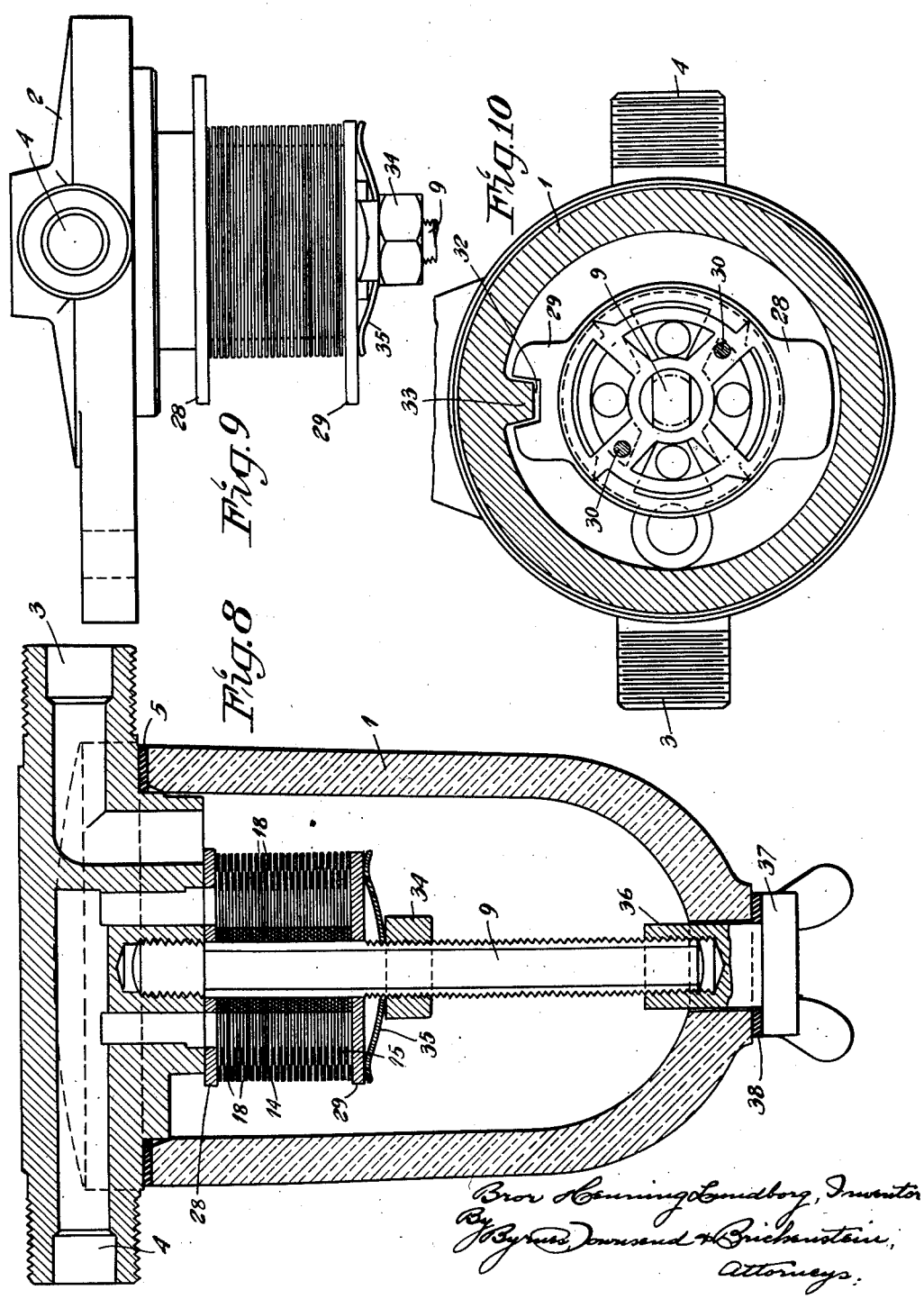

Patented Mar. 15, 1932

1,849,582

UNITED STATES PATENT OFFICE

BROR HENNING LUNDBORG, OF STOCKHOLM, SWEDEN, ASSIGNOR TO SVENSKA ACKUMULATOR AKTIEBOLAGET JUNGNER, OF STOCKHOLM, SWEDEN, A JOINT-STOCK COMPANY

LIQUID FILTER

Application filed October 24, 1929, Serial No. 402,252, and in Sweden October 30, 1928.

The present invention refers to liquid filters of the type comprising a plurality of superimposed thin sheet-metal disks provided with inner openings, said disks being so arranged that narrow spaces are formed between them, where filtration will take place when the liquid flows from the outside and into the inner openings of the disks, or vice versa.

In filters of this type as hitherto known it has been necessary to arrange special intermediary washers between the various disks so as to form the filtering spaces and, furthermore, the cleaning of these filters would meet with difficulties, special means having had to be provided for this purpose.

The present invention aims at considerably simplifying the construction of such filters by the avoidance of special washers and of special cleansing devices.

The invention consists principally in that the disks forming the filter and provided with inner openings are shaped in such manner that in a certain mutual position each other disk projects outside the intermediate disks so that communicating connecting passages are produced between the space outside the disks and the inner channel formed by the inner openings of the disks, said connecting passage extending partly through the space between the side surfaces of the projecting parts, partly between the outer and the inner contour of adjacent disks, and partly through the space between the side surfaces of the inner parts among themselves, these connecting passages being so adapted as to prevent contaminations beyond a certain size from passing therethrough. Preferably, the disks may be connected with each other in two separate groups with each other disk situated in each group, and they may be arranged, for instance, on a common central shaft, so that by a relative rotary movement cleansing of the two groups will be effected. Moreover, the disks may be shaped so as to cover one another in a certain position, so that the space outside the disks and the inner channel are cut off from each other, whereby the filter may also serve as a valve.

The accompanying drawings illustrate a few embodiments of a filter according to this invention. Fig. 1 is a vertical section of a filter according to one embodiment. Fig. 2 is an elevation thereof. Figs. 3, 4 and 5 show the disks forming the filter, Figs. 3 and 4 representing the disks each per se, while Fig. 5 shows two superimposed disks. Fig. 6 shows a modified embodiment of a filtering disk. Fig. 7 is an elevation of a filter according to a further embodiment. Fig. 8 is a vertical section of a filter according to a third embodiment. Fig. 9 shows a detail, and Fig. 10 a horizontal section thereof. Figs. 11 and 12 show two appurtenant filtering disks. Figs. 13–18 show a few further embodiments of the filtering disks.

In the embodiment according to Figs. 1 and 2, 1 designates the filter casing, which preferably consists of glass, and 2 is a cover consisting of metal and having provided therein an inlet 3 and an outlet 4 for the liquid to be filtered, such as benzine, oil or the like. Provided between the cover and the casing is a packing 5, and the parts are retained and pressed together by means of a strap 6 suspended from the cover 2, said strap being provided at its lower end with a screw 7 adapted to press a dished plate 8 against the bottom of the casing 1. Screwed-in centrally from the inside of the cover 2 is a stud 9 having the filtering disks 11 and 12 threaded thereon, said disks being provided with a central aperture 10, Figs. 3–5. The disks are forced against the inside of the cover by means of a handle 13 screwed onto the free end of the stud 9.

Here, the filtering disks 11 and 12 are formed of four integral annular segments 14, 14 and 15, 15, the radii of these segments being, in pairs, the same for the circular outer and inner contours of the segments, and the radius of the inner contour of the segments 14 being somewhat greater than the radius of the outer contour of the segments 15, so that, if the disks are superimposed, as is shown in Fig. 5, with the greater annular segments 14, enclosing the smaller annular segments 15, so to say, narrow circular spaces 17 will be formed between these different pairs of segments. Moreover, if a further similar disk be placed on the disks shown in Fig. 5, in the same position as the lower disk, a further space 18, Fig. 1 will be formed between the lowermost and the uppermost disks. By superimposing a number of disks 11 and 12, as shown in Fig. 1, and by causing these disks alternately to assume the positions shown in Fig. 5, intermediate spaces will thus be provided between the various disks, i.e. the spaces 18 between the equally situated annular segments 14, 14 and 15, 15 respectively, and also between the outer and the inner contours of the various annular segments 14, 15.

The equally situated filter disks 11 and 12 respectively may preferably be interconnected to a group so that, consequently, two groups are formed with each other disk pertaining to each group. For this purpose, there is provided a recess 19 at a point of the circumference of every disk, said recesses receiving a pin 20 or 21 respectively, Fig. 2, the one of which 20 is secured in the cover 2 and the other 21 in the handle 13, and each pin engaging each other disk, so that by turning the handle relatively to the cover, after the latter has been loosened, the disks 11 and 12 of the two groups may be caused to assume a position where all equally situated annular segments cover one another, and by which turning movement contaminations that have accumulated in the intermediate spaces between the disks may be wiped off onto the outer or the inner circumference of the different annular segments. Moreover, as in the said position the annular segments form entirely smooth surfaces on the outside as well as on the inside, the cleaning is rendered a very simple procedure.

The flow of liquid through the filter, when the latter is in use, is indicated by arrows in Fig. 1. It is obvious, however, that the supply may take place through the channel 4 and the discharge through the channel 3.

In Fig. 6 is shown a modified embodiment of a filter disk 23, which differs from those according to Figs. 3 and 4 substantially only in that the same is formed out of two annular segments 24 and 25 of different radii instead of from four annular segments. The inner contour of the greater annular segment 24 has then a somewhat greater radius than the outer contour of the smaller segment 25 so that, when two disks are superimposed, a space is formed between the said contours, corresponding to the space 17 in Fig. 5. Besides, intermediate spaces are formed between the equally situated annular segments 24 and 25 respectively of the superimposed disks, in the same manner as in the embodiment according to Figs. 1-5.

The embodiment of the liquid filter shown in Fig. 7 differs from that shown in Figs. 1 and 2 only in that the two groups of disks 11 and 12 may be turned relatively to each other from the outside, that is to say, with the cover 2 rigidly secured to the casing 1. To this end the central stud 9 guiding the disks 11, 12 extends out through the cover 2 and is provided with a turning handle 26, whereas the inner end thereof is attached to a supporting plate 27 for the disks, to which plate is secured the pin 21 engaging each other disk. Turning of the two groups of disks relatively to each other and consequent cleaning of the spaces between the disks may thus take place whenever desired during the function of the filter, and at the same time it will be possible to adjust the groups of disks into the position where all annular segments 14 and 15 respectively of the same size, Figs. 3-5, and 24 and 25 respectively, Fig. 6, cover one another, the inlet and the outlet being then entirely cut off from each other.

In Figs. 8-12 is shown a further embodiment of a liquid filter adjustable during operation, the filter disks 11 and 12 being here of the same construction, in principle, as those shown in Figs. 3 and 4. The stud 9 screwed fast into the cover 2 at the center thereof, on which stud the said disks 11, 12 are threaded, here extends downwardly to the bottom of the casing 1, the same being threaded for the greater portion of its length and, moreover, flattened at two diametrically opposed sides for the whole of its length. The central hole 10 in the disks 11 is circular, and these disks may thus be freely turned about the stud 9, whereas the corresponding hole 10 of the other disks 12 is oblong and of the same shape as the flattened stud 9, so that a relative turning movement between these latter disks and the stud is not possible. All disks 11 and 12 are arranged between two plates 28 and 29, with which each other disk, that is to say the disks 11 freely rotatable on the stud 9, is connected by means of pins 30 secured to the said plates and extending through apertures 31 situated entirely inside the circumference of even the smaller annular segments 15 of the disks 11, Fig. 11. According to Fig. 10, a recess 32 is provided at one point of the two plates 28 and 29, which recesses engage over a projection 33 formed on the inside of the casing 1, so that relative rotary movement between the plates and thus between the group of disks 11 and the casing 1 is prevented.

The plates 28 and 29 and the intermediate disks 11, 12 are kept forced against the inside of the cover 2 by means of a nut 34 screwed onto the stud 9 with an intermediate spring washer 35. Securing of the cover 2 to the casing 1 is effected by means of a sleeve nut 36 screwed onto the lower end of the stud 9, said nut extending through a corresponding opening in the bottom of the casing, a packing 38 being provided between the flange 37 of the nut and the casing.

Here, the cleaning of the filter or the cutting off of the inlet 3 and the outlet 4 from each other is effected, if desired upon loosening the nut 36 to some extent, by turning the casing 1 with respect to the cover 2. Through the connection 32, 33 between the casing and the plates 28, 29 with the one group of disks 11, the said turning movement will also cause the plates 28, 29 and the group of disks 11 to be turned, while the stud 9 with the group of disks 12 is retained in the cover 2. When turning has been effected into the position in which the equally great annular segments 14 and 15 respectively of the disks 11, 12 cover one another, and where a cut-off has thus been brought about, the pins 30 engaging the apertures 31 of the disks 11 will assume the positions shown by dotted lines in Fig. 12 in relation to the other disks 12. The pins 30 are thus caused to bear on two of the radial bonds of the disks 12, which bonds serve as a catch against further movement in the said direction, and indicate the limit of a complete cut-off of the filter passage, while the two other opposed radial bonds indicate the limit for the entirely open filter in a similar manner. By adjusting the groups of disks between these two extreme positions the area of passage of the filter may thus be varied, which obviously is also the case in the embodiments according to Figs. 1 and 2 and 7.

If desired, the inlet and the outlet for the liquid may obviously change places also in the embodiment according to Figs. 8–10.

In the embodiment shown in Fig. 13, each filter disk consists of a spiral-shaped outer ring 39 and 40 respectively which is connected through radial bonds 41 with a central annular part 42. Here, too, the disks are mutually alike, so that in the position shown in the drawing spaces are formed, first, between the side surfaces of the projecting portions, second, between the outer and inner contours of adjacent disks and, third, between the side surfaces of the inner portions, in the same manner as in the embodiments above described. In a position angularly displaced by 180 degrees in relation to the position shown, the disks will cover one another completely and cut off the inlet and the outlet from each other, cleansing being effected at the same time by the turning movement.

Fig. 14 shows filter disks 43 and 44 of a rectangular shape and of the same size, these disks being connected by cross bonds 45 with a central annular part 46. Otherwise the erection of a filter from the disks 43 and 44 and the action of the filter are the same as in the embodiments hereinbefore described, cutting off of the inlet and the outlet from each other being thus also effected by turning the one group of disks through 90 degrees relatively to the other.

Fig. 15 shows an embodiment where such cutting-off cannot take place. Here, the filter disks 47 and 48 are of a square shape, but the disks are of different sizes, so that the outer contour of the smaller disk 48 will be situated entirely inside the inner contour of the larger disk 47, whereby the requisite filtering spaces are formed.

In the embodiment shown in Figs. 16 and 17, the filter disks are substantially of the same shape as those shown in Figs. 11 and 12. Here, however, the farthest protecting portions 14 of the disks of the one group, Fig. 16, are provided with projections 49 with apertures 50 adapted to receive pins connected to the apparatus, so that the said group of disks will be retained when the other group, Fig. 17, is turned. Thus the latter group may be turned round without being locked in any certain position by the said pins as in the embodiments according to Figs. 11 and 12.

The projections 49 may also be made without apertures, and the locking pins 51 may be disposed laterally of the projections, as shown in Fig. 18.

It should be noted in regard to all embodiments shown that the disks of the one group may be made thicker than the disks of the other group, whereby the spaces between the side surfaces of the projecting parts will be larger than the spaces between the side surfaces of the inner portions, or vice versa. By further adapting the width of the space between the outer and inner contours of the disks in a suitable manner, it is possible thus to obtain a filter where, for instance, the space between the side surfaces of the projecting parts is larger than the space between the outer and inner contours, and where this latter space, in turn, is larger than the space between the side surfaces of the inner parts, whereby a gradual filtration of larger and smaller contaminations is obtained. If the supply takes place through the inner openings of the filter disks, the relation between the sizes of the spaces between the projecting and the inner portions of the filter disks should preferably be reversed. If desired, special intermediate washers may also be used for the same purpose.

It should be further noted that the invention is not limited to the embodiments shown in the drawings, inasmuch as the filter disks may also assume other shapes than those illustrated, provided that they bring about the requisite spaces of passage in a certain position.

What I claim as new and desire to secure by Letters Patent of the United States of America is:—

1. A liquid filter comprising a plurality of disks having extended portions, intermediate portions and inner openings, said disks arranged in superimposed relation whereby the extended portion of each alternate disk projects outside of the intermediate portions of the disks adjacent thereto, and a passage between the outside of said disks and a channel formed by said inner openings, said passage extending between the faces of adjacent extended portions, between the inner and outer edges of adjacent disks and between the faces of adjacent intermediate portions.

2. The invention as defined in claim 1 in combination with means for cleaning said filter, said means comprising a second means for connecting alternate disks whereby they may be moved relatively to the other disks.

3. The invention as defined in claim 1 wherein alternate disks comprise one group and the other disks comprise a second group, means connecting the disks of each group, means to move one of said groups relatively to the other so that the disks of one group will completely cover adjacent disks of the other group.

4. The invention as defined in claim 1 wherein the disks are alternately made of different thicknesses.

5. The invention as defined in claim 1 having in combination a casing surrounding said filter and a handle located outside of said casing, said disks alternately separated into two groups, the disks of each group connected together, said handle adapted to turn one group relatively to the other to clean the filter.

6. The invention as defined in claim 1 having alternate disks comprising one group and the other disks another group, said disks being so shaped as to cover each other, in a certain angular position, a casing for said filter and a handle located outside of said casing to turn one of said groups relatively to the other.

7. The invention as defined in claim 1 having a filter casing, a cover turnable relatively to said casing, said alternate groups comprising one group and the other disks another group, means to turn one of said groups relatively to the other to clean the filter, one of said groups being connected to said cover and the other of said groups being connected to said casing.

8. The invention as defined in claim 1 having said alternate disks comprising one group and the other disks comprising another group, said disks so shaped as to cover one another when in a certain angular position, means to turn one group relatively to the other group, a casing with a cover turnable relatively to said casing, one of said groups connected to said cover and the other of said groups connected to said casing.

9. The invention as defined in claim 1 having said disks connected to each other in two separate groups, each alternate disk comprising one group, means for turning the one group of disks relatively to the other group so as to bring about cleaning of the filter, and members for locking the one group of filter disks against rotary movement, said members being located outside the contour of the disks of the other group.

10. The invention as defined in claim 1 having said disks connected to each other in two separate groups, each alternate disk comprising one group, and being further so shaped as to cover one another in a certain angular position, means for turning the one group of disks relatively to the other group, and members for locking the one group of filter disks against rotary movement, said members being located outside the outer contour of the disks of the other group.

11. The invention as claimed in claim 1 having said disks connected with each other in two separate groups, each alternate disk belonging to one group, and being further so shaped as to cover one another in a certain angular position, means for turning the one group of disks relatively to the other group, and means for limiting the relative turning movement of the groups of disks in a position for complete closure.

12. The invention as claimed in claim 1 wherein each of said disks comprises a spiral-shaped outer ring connected by a radial bond to a central portion.

In testimony whereof I affix my signature.

BROR HENNING LUNDBORG.